US011625667B2

(12) United States Patent
Bikumala et al.

(10) Patent No.: US 11,625,667 B2
(45) Date of Patent: Apr. 11, 2023

(54) CIRCUIT WITH SENSOR TO MONITOR AND TRACK A CONTAINER

(71) Applicant: Dell Products L. P., Round Rock, TX (US)

(72) Inventors: Sathish Kumar Bikumala, Round Rock, TX (US); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 566 days.

(21) Appl. No.: 16/173,045

(22) Filed: Oct. 29, 2018

(65) Prior Publication Data
US 2020/0134554 A1 Apr. 30, 2020

(51) Int. Cl.
| | |
|---|---|
| G06Q 10/08 | (2012.01) |
| G06Q 10/0833 | (2023.01) |
| G06Q 10/0837 | (2023.01) |
| H04W 4/02 | (2018.01) |
| G01J 1/44 | (2006.01) |
| G01N 27/407 | (2006.01) |
| G06Q 10/0835 | (2023.01) |

(52) U.S. Cl.
CPC ........... *G06Q 10/0833* (2013.01); *G01J 1/44* (2013.01); *G01N 27/407* (2013.01); *G06Q 10/0835* (2013.01); *G06Q 10/0837* (2013.01); *H04W 4/025* (2013.01)

(58) Field of Classification Search
CPC .......... G06Q 10/0833; G06Q 10/0835; G06Q 10/0837; G06Q 30/0633; H04W 4/025; G01J 1/44; G01N 27/047
See application file for complete search history.

(56) References Cited

U.S. PATENT DOCUMENTS

| | | | | |
|---|---|---|---|---|
| 9,262,896 | B1 * | 2/2016 | Mostov | G08B 25/08 |
| 9,760,854 | B1 * | 9/2017 | Chowdhary | G06Q 10/0838 |
| 10,074,247 | B1 * | 9/2018 | Tang | G08B 21/0275 |
| 2002/0019785 | A1 * | 2/2002 | Whitman | G06Q 30/06 |
| | | | | 705/28 |

(Continued)

OTHER PUBLICATIONS

Dynamically Generate Promotion in a Region for the Unopened In-transit Returned Items in the Region, IP.com Prior Art Database, Feb. 10, 2017 (Year: 2017).*

*Primary Examiner* — Rupangini Singh
(74) *Attorney, Agent, or Firm* — Krishnendu Gupta; Deepika Bhayana; Lesley A. Leonessa

(57) ABSTRACT

In some examples, a server may receive a first order to acquire a product. The server may receive a request to cancel the first order and determine that the product has shipped. The server may determine, based on sensor data received from a sensor of a circuit board in the container, that the container is unopened. After receiving a second order to ship the product to a second location, the server may instruct a courier to transport the product to the second location. For example, if the container is located at the first location, the server may instruct the courier to transport the container from the first location to the second location. If the server determines that the courier is currently transporting the container to the first location, the server may instruct the courier to transport the container to the second location instead of to the first location.

11 Claims, 10 Drawing Sheets

(56) References Cited

U.S. PATENT DOCUMENTS

| | | | |
|---|---|---|---|
| 2008/0065500 A1* | 3/2008 | Foth | G06Q 10/08 |
| | | | 705/26.1 |
| 2015/0213705 A1* | 7/2015 | Ehrman | G08B 21/182 |
| | | | 340/541 |
| 2016/0292635 A1* | 10/2016 | Todasco | H04W 4/023 |
| 2017/0262790 A1* | 9/2017 | Khasis | G08G 1/012 |
| 2017/0330142 A1* | 11/2017 | Kanellos | G06Q 10/0832 |
| 2017/0352249 A1* | 12/2017 | Clip | A45C 13/18 |
| 2019/0037362 A1* | 1/2019 | Nogueira-Nine | G01S 5/0027 |
| 2019/0362308 A1* | 11/2019 | Memon | G06Q 10/0838 |
| 2020/0051015 A1* | 2/2020 | Davis | G06Q 10/0833 |

* cited by examiner

CIRCUIT WITH SENSOR TO MONITOR AND TRACK A CONTAINER

BACKGROUND OF THE INVENTION

Field of the Invention

This invention relates generally to a circuit (e.g., circuit board) that includes a sensor that can be used with a shipping container to provide information about the shipping container, including when the shipping container is opened.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When a customer places an order for a product and then cancels the order after the order has shipped, the customer receives the order (or refuses delivery) and returns the product to the seller. The seller verifies (e.g., by checking the serial number) that the correct item was returned, re-tests the product, and re-sells the product, at a lower price than the product sold for, as an "open box", "re-certified", or "refurbished" product.

In some cases, after the initial order for the product has been placed, the customer may cancel the order because the customer's needs have changed or the customer has found a different product that is better suited to their needs. In such cases, the customer may return the product, unopened, back to the seller. Because the seller cannot verify that the product was unopened, the seller opens the box of the product to verify that the correct item was returned and to re-test the product. After the seller opens the box of the product, the product can no longer be sold as a "new" product, causing the value of the product to depreciate significantly. Thus, a seller may lose a significant amount of money on products that have been shipped and returned, unopened, to the seller, particular for high value products, such as, for example, laptops, desktop computers, monitors, tablets, and the like.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may include one or more processors and one or more non-transitory computer readable media storing instructions executable by the one or more processors to perform various operations. The server may receive a first request to acquire a product. In response, the server may instruct a warehouse to ship the product to a first location. The server may receive a second request to cancel the order and determine that the product has been shipped to the first location in a container that includes a circuit board having a sensor and a modem. The server may determine, based on sensor data generated by the sensor and sent by the modem, that the container is unopened and may place the product in a canceled order inventory. The server may receive a second order to acquire the product and ship the product to a second location. The server may instruct a courier to transport the product to the second location. In some cases, instructing the courier to transport the product to the second location may include determining that the container is located at the first location and instructing the courier to transport the container from the first location to the second location. In other cases, instructing the courier to transport the product to the second location may include determining that the courier is transporting the container to the first location and instructing the courier to transport the container to the second location instead of to the first location. As a first example, an insulated cable may be wrapped around an exterior of the container and electrically coupled to the circuit board to create a circuit having a closed state. Cutting a portion of the insulated cable to open the container may cause the circuit board to determine that the circuit has changed from the closed state to an open state, indicating that the container has been opened. As a second example, packing tape that includes an embedded conductor may be used to seal the container. The embedded conductor may be electrically coupled to the circuit board to create a circuit having a closed state. Cutting a portion of the packing tape may cause the circuit board to determine that the circuit has changed from the closed state to an open state, indicating that the container has been opened. As a third example, the sensor may be light sensitive and the container may include a seal sufficient to prevent light from entering into the container. Breaking the seal of the container may cause the light to strike the sensor, causing the circuit board to determine that the container has been opened. As a fourth example, the sensor may be sensitive to oxygen and the container may include a seal sufficient to prevent oxygen from entering into the container. Breaking the seal of the container may cause the sensor to detect oxygen (e.g., in the atmosphere), causing the circuit board to determine that the container has been opened.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
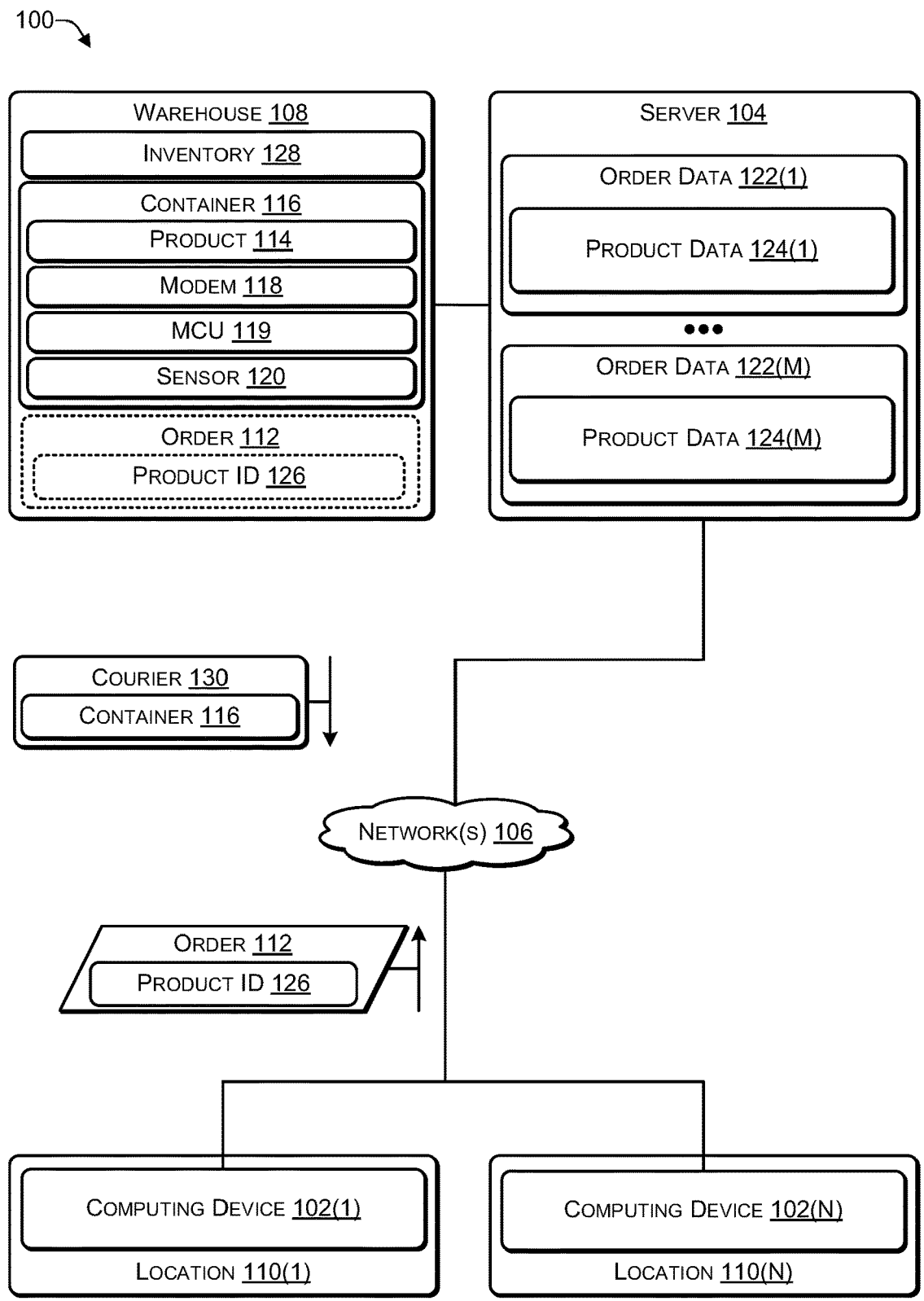
FIG. 1 is a block diagram of a system in which a product is shipped to a customer location after an order is received, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a seller to ship a product specified in a first order (from a first customer) to a first location and determine when a product container of the product has been opened. If the first customer cancels the original order after the product has been shipped, the systems and techniques enable the seller to determine whether the product container has been opened. If the product container is unopened, the seller places the product in a "canceled orders" inventory list. When the seller receives a second order (from a second customer) for the same product, the systems and techniques enable the seller to instruct the first customer (e.g., who canceled the first order) to directly ship the product in the unopened container from the first (e.g., current) location to a second (e.g., new) location specified in the second order. For example, the seller may provide the customer with a shipping label for the unopened container and instruct a courier (e.g., FedEx®, UPS®, USPS®, or the like) to pickup the unopened container from the current location and deliver the unopened container to the new location specified in the second order.

In this way, a product in an unopened container can be sold at an undiscounted price and shipped directly from a first customer that placed (and then canceled) a first order to a second customer that placed a second order for the same product. The product in the unopened container is shipped directly from the first location to the second location without returning the unopened container to the seller. The seller avoids the time and expense of receiving the product and processing the return, e.g., verifying the authenticity of the returned product, testing and re-certifying the returned product, and advertising and selling the returned product. The seller may list the product in inventory and sell the product to a second customer while the product is enroute to, or after the product has arrived at, the first location. The seller avoids the loss incurred by discounting the returned product as a refurbished or open-box product as compared to selling the unopened product as a new product. The seller can deliver the product quickly to the second customer (e.g., as compared to the seller receiving the unopened container from the first customer and then shipping the unopened container to the second customer).

In some examples, a server includes one or more processors and one or more non-transitory computer readable media storing instructions executable by the one or more processors to perform various operations. The operations may include receiving a first order to acquire a product and to ship the product to a first location. The product may be placed in a container and shipped to the first location. The container may include a circuit board having a sensor and a modem. The operations may include receiving a request to cancel the first order and determining that the product has been shipped to the first location. The operations may include receiving sensor data from the sensor. For example, the modem may transmit (e.g., over a wireless network) sensor data generated by the sensor to the server. The operations may include determining, based on the sensor data, that the container is unopened, placing the product in a canceled order inventory, receiving a second order to ship the product to a second location, and instructing a courier to transport the product to the second location. For example, if the server determines that the container has been delivered and is located at the first location, then the server may instruct the courier to transport the container from the first location to the second location. If the server determines that the courier is transporting the container to the first location (e.g., the container is enroute to the first location), then the server may instruct the courier to transport the container to the second location instead of to the first location. As a first example, an insulated cable may be wrapped around an exterior of the container and electrically coupled to the sensor to create a circuit having a closed state. Cutting a portion of the insulated cable to open the container may cause the sensor to generate the sensor data indicating that the circuit has changed from the closed state to an open state. As a second example, packing tape that includes an embedded conductor may be used to seal the container. The embedded conductor is electrically coupled to the sensor to create a circuit having a closed state. Cutting a portion of the packing tape to open the container may cause the sensor to generate the sensor data indicating that the circuit has changed from the closed state to an open state. As a third example, the circuit board may include an oxygen sensor that can detect the presence of oxygen. The container may include a seal (e.g., a vacuum seal) sufficient to prevent oxygen from entering into the container. Breaking the seal of the container may cause the sensor to detect oxygen in the atmosphere, thereby causing the sensor to determine that the container has been opened. As a fourth example, the sensor may be light sensitive. The container may include a seal sufficient to prevent light from entering into the container. For example, breaking the seal of the container may cause the light to strike the sensor, thereby causing the sensor to generate the sensor data indicating that the container has been opened.

In this way, if a product has already been shipped and the container that includes the product is unopened, a manufacturer can provide a full refund if an order is canceled. If the product is enroute (e.g., in-transit) to a first location specified in the initial order, the manufacturer may return the product to inventory and ship the product to a second location when a second order is received. If the product has already arrived at the first location specified in the initial order, the manufacturer may return the product to inventory. When a second order for the product is received, the manufacturer may instruct the courier to pick up the container from the first location and deliver the container to a second location specified in the second order. Thus, the manufacturer can avoid having to open the container and inspect the product to verify that the product has been used and can avoid selling the product as a refurbished product and losing money selling the refurbished product.

FIG. 1 is a block diagram of a system 100 in which a product is shipped to a customer location after an order is received, according to some embodiments. In the system 100, multiple computing devices 102(1) to 102(N) (N>0) may be connected to a server 104 via one or more networks 106. The server 104 may be connected to a warehouse 108 (e.g., via a private or internal network). Each of the computing devices 102 may have an associated location. For example, the computing device 102(1) may be located in a location 110(1) and the computing device 102(N) may be located in a location 110(N). A particular location 102 may be geographically different from others of the locations 102. For example, the location 110(N) may be geographically different from the other locations 110(1) to 110(N−1).

A first customer may use the computing device 102(1) to send an order 112 (e.g., via an e-commerce website) to the server 104. The order 112 may be to acquire (e.g., purchase or lease) a representative product that is identified by a product identifier (ID) 126. Of course, an order may be to acquire more than one item and may include multiple product identifiers. For ease of understanding, the order 112 is illustrated as having a single product identifier 126.

The server 104 may receive the order 112. The server 104 may store information associated with multiple orders, such as order data 122(1) to 122(M) (M>0). Each order data 122 may include corresponding product data 124. For example, the order data 122(1) may include product data 124(1) and the order data 122(M) may include product data 124(M). The order data 122 may include information about each order, such as an order number, a customer name, a customer phone number, a location to which the product(s) in the order are to be shipped, payment information, and the like. The product data 124 may include product-related information, such as a listing of products associated with the corresponding order, a price of each product, a location (e.g., a warehouse) of each product, and the like. After receiving the order 112, the server 104 may store the order 112 in the order data 122. For example, assume the order 112 is stored as the order data 122(1) and the product ID 126 is stored in the product data 124(1).

The server 104 may determine that a product 114 identified by the product ID 126 is located in an inventory 128 of the warehouse 108 and send the order 112 to the warehouse 108 for fulfillment. The warehouse 108 may place the product 114 in a container 116 (e.g., a shipping container, such as a cardboard box). The warehouse 108 may include a modem 118, a microcontroller unit (MCU) 119, and at least one sensor 120 in the container 116. In some cases, the modem 118, the MCU 119, and the sensor 120 may be discrete components on a circuit board. In other cases, the modem 118, the MCU 119, and the sensor 120 may be integrated into a single integrated circuit, known as a system-on-a-chip (SOC). While a single sensor 120 is illustrated, the sensor 120 may include multiple sensors, such as, for example, a light sensor, an oxygen (O2) sensor, an electronic compass (e-compass), an accelerometer, a gyroscope, a global positioning system (GPS) sensor, another type of sensor, or any combination thereof. The MCU 119 may include one or more central processing units (CPUs), e.g., processor cores, along with memory and programmable input/output peripherals. In some cases, the MCU 119 may use four-bit words and operate at frequencies as low as 4 kiloHertz (kHz) for low power consumption (single-digit milliwatts or microwatts). The MCU 119 may be capable of retain functionality while waiting for an event (e.g., receiving sensor data indicating that the container 116 has been opened). In a sleep mode, a power consumption of the MCU 119 may be nanowatts, enabling the MCU 119 to be powered by a battery.

The modem 118 and the MCU 119 may be communicatively coupled to the sensor 120 to enable the modem 118 to (1) wirelessly receive a message (e.g., from the server 104) and pass the message to the sensor 120 and (2) receive sensor data generated by the sensor 120 and wirelessly transmit the sensor data via the network 106 to, for example, the server 104. While the modem 118, the MCU 119, and the sensor 120 are shown as being separate devices, in some implementations, the functionality of the modem 118 and the sensor 120 may be combined into a single device (e.g., SOC). The modem 118 may be capable of wireless transmissions using one or more protocols, such as, for example, Wi-Fi®, Bluetooth®, High Speed Packet Access (HSPA), High Speed Downlink Packet Access (HSDPA), High Speed Uplink Packet Access (HSUPA), and the like. The sensor 120 may be capable of determining a location of the container, e.g., using global positioning satellites (GPS) or similar technology. The sensor 120 may broadcast a unique identifier, such as a radio frequency identifier (RFID), that can be tracked to electronically determine a location of the container 116.

The sensor 120 may be capable of determining whether the container 116 has been opened or not. As a first example, an insulated wire that is electrically connected to the sensor 120 may be wrapped around the container 116. To open the container 116, the recipient may cut the insulated wire, causing the sensor 120 to determine that the wire has been cut (e.g., changing a circuit that includes the wire and the sensor 120 from closed to open), indicating that the container 116 is being opened. As a second example, the container 116 may be sealed using a packing tape having an embedded electrical conductor that is electrically connected to the sensor 120. To open the container 116, the recipient may cut a portion of the packing tape, causing a break in the embedded electrical conductor (e.g., changing a circuit that includes the embedded electrical conductor and the sensor 120 from closed to open). In response, the sensor 120 may determine that the embedded electrical conductor has been cut, indicating that the container 116 is being opened. As a third example, a light-sensitive sensor 120 may be placed inside the container 116 before the container 116 is sealed (e.g., with packing tape). When the recipient opens the container 116 and/or removes the product 114 from the container 116, light may shine on the sensor 120, causing the sensor 120 to determine that the container 116 has been opened. As a fourth example, the sensor 120 may include an oxygen sensor. The sensor 120 and the product 114 may be vacuum sealed in the container 116. For example, the sensor 120 and the product 114 may be vacuum sealed inside a plastic bag which is then placed in the container 116. When the recipient opens the container 116 (or bag), the presence of oxygen may cause the oxygen sensor 120 to determine that the container 116 has been opened. Of course, these are merely examples and other types of sensors may be used. Due to the costs of the modem 118 and the sensor 120, the systems and techniques may be applied to products having a value greater than or equal to a threshold amount (e.g., $500 or greater). In some cases, the product 114 may be placed in a packaging container (e.g., display box) and the packaging container may be placed in a (larger) shipping container that includes packing materials (e.g., paper, foam, or the like) to cushion the product 114. The container 116 may reference the packaging container or the shipping container. The modem 118, the MCU 119, and the sensor 120 may be associated with the packaging container, the shipping container, or both. The container 116 may be considered unopened if the packaging (e.g., inner) container is unopened. For example, container 116 may be considered unopened if the shipping (e.g., outer) container is opened but the packaging (e.g., inner) container remains unopened.

When the sensor 120 detects that the container 116 has been opened, the sensor 120 may send sensor data (e.g., indicating that the container 116 has been opened), using the modem 118 (and the network 106), to the server 104. The server 104 may modify the corresponding order data 122 to indicate that the container has been opened. In some cases, the server 104 may send a query, via the network 106 and received by the modem 118, to the sensor 120 as to a status of the container 116. The sensor 120 may determine whether the container 116 is unopened or opened, e.g., is the circuit associated with the sensor 120 closed (e.g., container 116 unopened) or open (e.g., container 116 has been opened), has the sensor 120 received light (e.g., container 116 is opened) or not received light (container 116 is unopened), or has the sensor 120 detected oxygen (e.g., container 116 is opened) or not detected oxygen (container 116 is unopened). The sensor 120 may send the status (e.g., opened or unopened) of the container 116, via the modem 118 and over the network 106, to the server 104. The sensor 120 may send sensor data to the server 104 after determining that the container 116 has been opened or in response to receiving a query from the server 104. The sensor 120 may, in some cases, periodically (e.g., every day) send sensor data indicating a status and/or a location of the container 116.

The warehouse may electronically instruct a courier 130 (e.g., FedEx®, UPS®, USPS®, or the like) to physically transport the container 116 from a location of the warehouse 108 to the location 110(1) identified in the order 112 as the delivery address. At this point in time, the container 116 (including the modem 118 and the sensor 120) has been shipped from the warehouse 108 and is enroute to the location 110(1) specified in the order 112.

Figure 2:
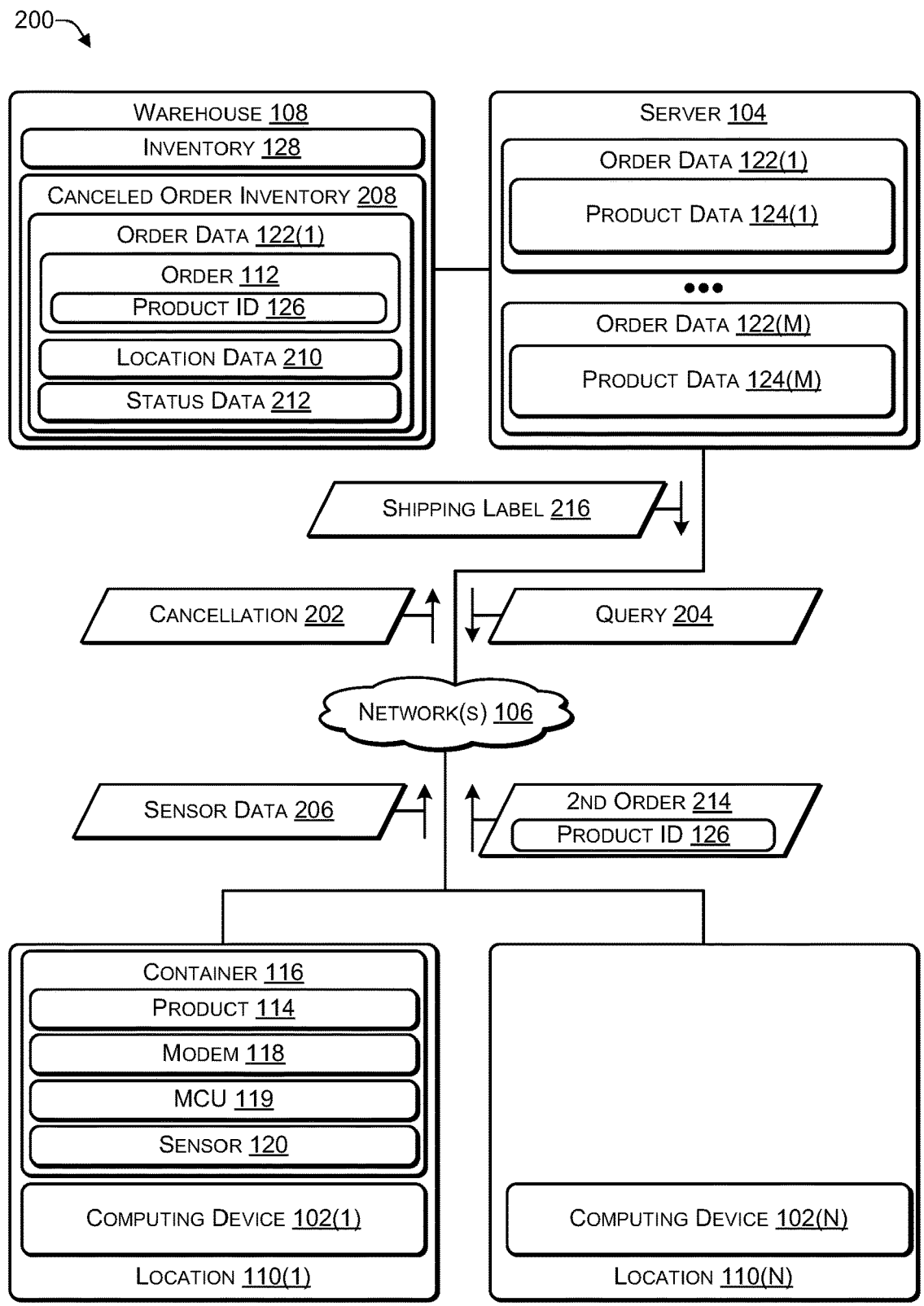
FIG. 2 is a block diagram of a system in which an order, for a product that has been shipped, is cancelled, according to some embodiments.

FIG. 2 is a block diagram of a system 200 in which an order, for a product that has been shipped, is cancelled, according to some embodiments. The first customer may decide to cancel the order 112 of FIG. 1 and send a cancellation notification 202 to the server 104.

The server 104 may receive the cancellation notification 202 and determine whether the container 116 has been opened. For example, the server 104 may send a query 204, via the network 106 and the modem 118, to the MCU 119. The MCU 119 may check the sensor 120 and send, via the modem 118 and the network 106, sensor data 206 (e.g., indicating whether a circuit associated with the sensor 120 is open or closed, whether the sensor 120 has received light, whether the sensor 120 has detected oxygen, or the like) to the server 104. The server 104 may determine, based on the sensor data 206, whether the container 116 is opened or unopened. The sensor 120 may send the sensor data 126 to the server 104 in response to determining that the container 116 has been opened or in response to receiving the query 204 from the server 104. The sensor 120 may, in some cases, periodically (e.g., every day) send the sensor data 206 to the server 104 indicating a status (and in some cases, a location) of the container 116.

If the server 104 determines, based on the sensor data 206, that the container 116 is unopened, then the server 104 may provide this information to the warehouse 108. The warehouse 108 may add the order data 122(1) associated with the order 112 to a cancelled order inventory 208. The order data 122(1) may include the order 112 and the product ID 126 of the product 114. The warehouse 108 may determine a location of the container 116 (e.g., from the courier 130 of FIG. 1), e.g., whether container 116 is enroute to the location 110(1) or whether the container 116 has arrived at the location 110(1), and store the location as location data 210 in the order data 122(1). The warehouse 108 may store a status of the container 116, e.g., the status of the container 116 is unopened, in status data 212.

The server 104 may monitor incoming orders to determine if any of the incoming orders are for products listed in the canceled order inventory 208, before determining if the products are in the inventory 128. For example, the server 104 may receive the second order 214 from the computing device 102(N). The server 104 may determine that the second order 214 is to acquire (e.g., purchase or lease) the product 114, associated with the product ID 126. The order 214 may indicate that the product 114 is to be shipped to the location 110(N). The server 104 may determine, based on the order 112 in the canceled order inventory 208 that the product 114 has been shipped to the location 110(1) and is currently unopened.

To fulfill the second order 214, the server 104 may electronically instruct a courier to physically transport the container 116 to the location 110(N). For example, the server 104 may electronically send a shipping label 216 to (1) the computing device 102(1) associated with the first customer at the location 110(1) or (2) the courier 130. The server 104 may instruct the first customer to apply the shipping label 216 to the container 116 and (1) drop the container 116 off at a particular courier's drop-off location or (2) wait for a particular courier to pick up the container 116 (with the shipping label 216) at the location 110(1). The instructions may ask the first customer to call the particular courier to have the container 116 picked up or the server 106 may automatically (e.g., without human interaction) notify the particular courier to pickup the container 116 from the location 110(1).

After the server 104 determines from the sensor data 206 that the container 116 is unopened, the server 104 may determine a current location of the container 116. If the courier 130 of FIG. 1 is in possession of the container 116 (e.g., the container 116 is enroute to the location 110(1)), then the server 104 may electronically instruct the courier 130 to deliver the container 116 to the location 110(N) instead of the location 110(1). For example, the server 104 may provide the new shipping label 216 to the courier 130.

Thus, at this point in time, the order 112 has been cancelled, the product ID 126 associated with the order 112 has been added to the canceled order inventory 208, the second order 214 has been identified as an order for the product ID 126 that is in the canceled order inventory 208, and the shipping label 216 has been provided for application to the container 116. If the container 116 is at the location 110(1), the first customer may apply the shipping label 216 to the container 116 and provide the container 116 to a particular courier. If the container 116 has not yet arrived at the location 110(1), the courier 130 of FIG. 1 may be instructed to deliver the container 116 to the location 110(N) instead of the location 110(1). If the container 116 is located at the location 110(1), the server 104 may electronically notify a courier to transport the container 116 from the current location 110(1) to the new location 110(N).

Figure 3:
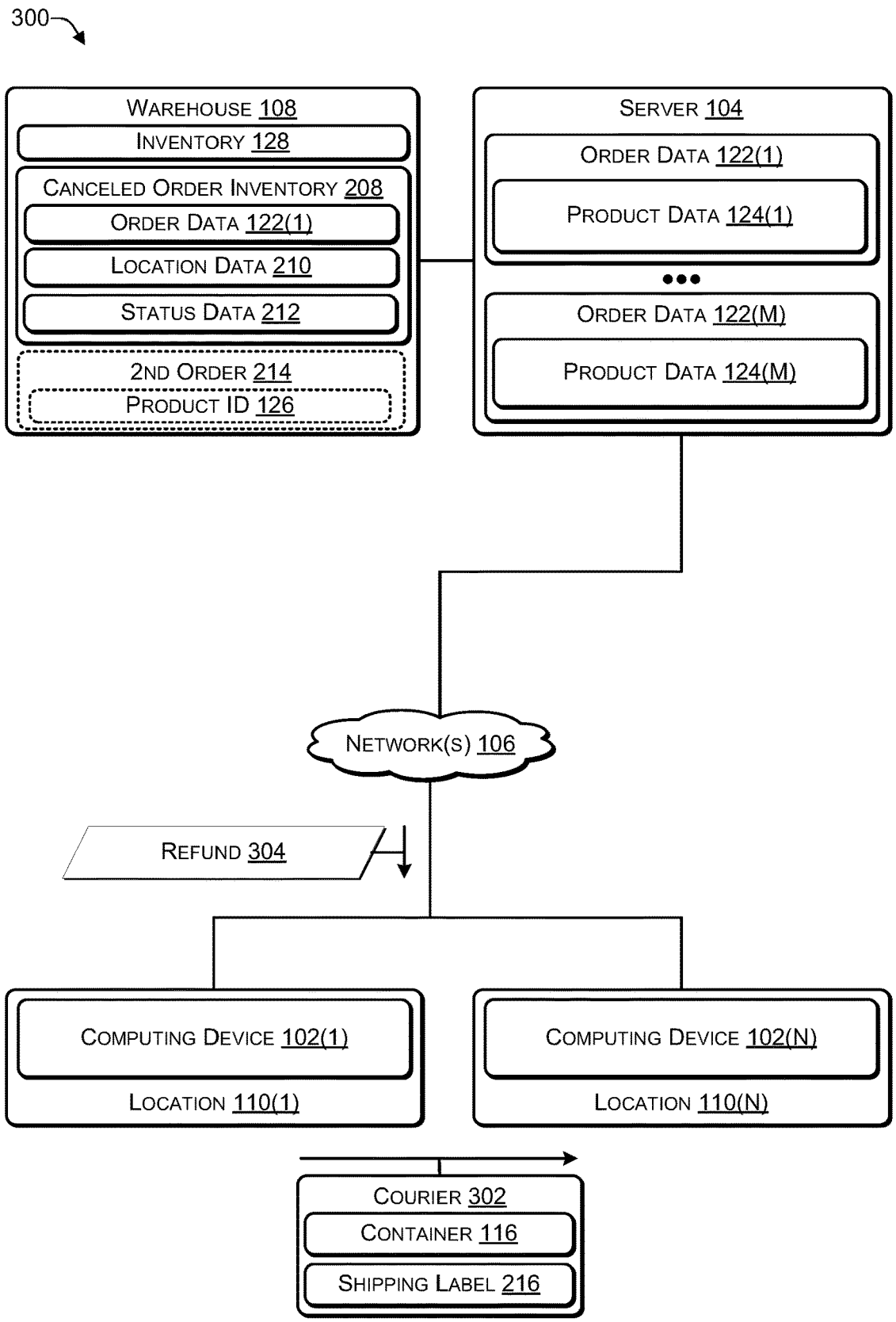
FIG. 3 is a block diagram of a system in which an unopened product is shipped from a first customer location to a second customer location, according to some embodiments.

FIG. 3 is a block diagram of a system 300 in which an unopened product is shipped from a first customer location to a second customer location, according to some embodiments. After the container 116 has arrived at the location 110(1), the shipping label 216 may be applied to the container 116. The courier 302 may transport the container 116 from the location 110(1) to the location 110(N) specified in the second order 214. The server 104 may track the shipment of the container 116 from the location 110(1) to the location 110(N).

In this way, the product 114 of FIG. 1 in the unopened container 116 is sold at an undiscounted price and shipped directly from the location 110(1) (e.g., associated with the first customer that placed and then canceled the order 112) to the location 110(N) (e.g., associated with the second customer that placed the second order 214 for the product 114). The product 114 in the unopened container 116 is shipped directly from the location 110(1) to the location 110(N) without returning the unopened container 116 to the seller's warehouse 108. The seller avoids the time and expense of receiving the product 114 and processing the return, e.g., verifying the authenticity of the returned product, testing and re-certifying the returned product, and advertising and selling the returned product. The seller may list the product ID 126 (e.g., of the product 114) in the canceled order inventory 208 and sell the product 114 to the second customer while the product 114 is enroute to, or after the product 114 has arrived at, the location 110(1). The seller avoids the loss incurred by discounting the returned product as a refurbished or open-box product as compared to selling the unopened product 114 as a new product. The seller can deliver the product 114 quickly to the location 110(N) of the second customer, e.g., as compared to the seller receiving the unopened container 116 from the location 110(1) and then shipping the unopened container 116 to the location 110(N).

Before the courier 302 takes possession of the container 116, if the server 104 receives the sensor data 206 of FIG. 2 from the sensor 120 and determines (from the sensor data 206) that the container 116 has been opened, then the server 104 may process the product 114 as an open-box return and fulfill the second order 214 from the inventory 128 of the warehouse 108 (e.g., rather than from the canceled order inventory 208). For example, the server 104 may cancel the shipping label to ship the container 116 from the location 110(1) to the location 110(N). The server 104 may send a new shipping label to the first customer to ship the opened container 116 from the location 110(1) to the warehouse 108. The warehouse 108 may process the opened container 116 by verifying an authenticity of the product 114, re-testing the product 114, and then selling the product 114 as an open-box or re-certified product.

Figure 4:
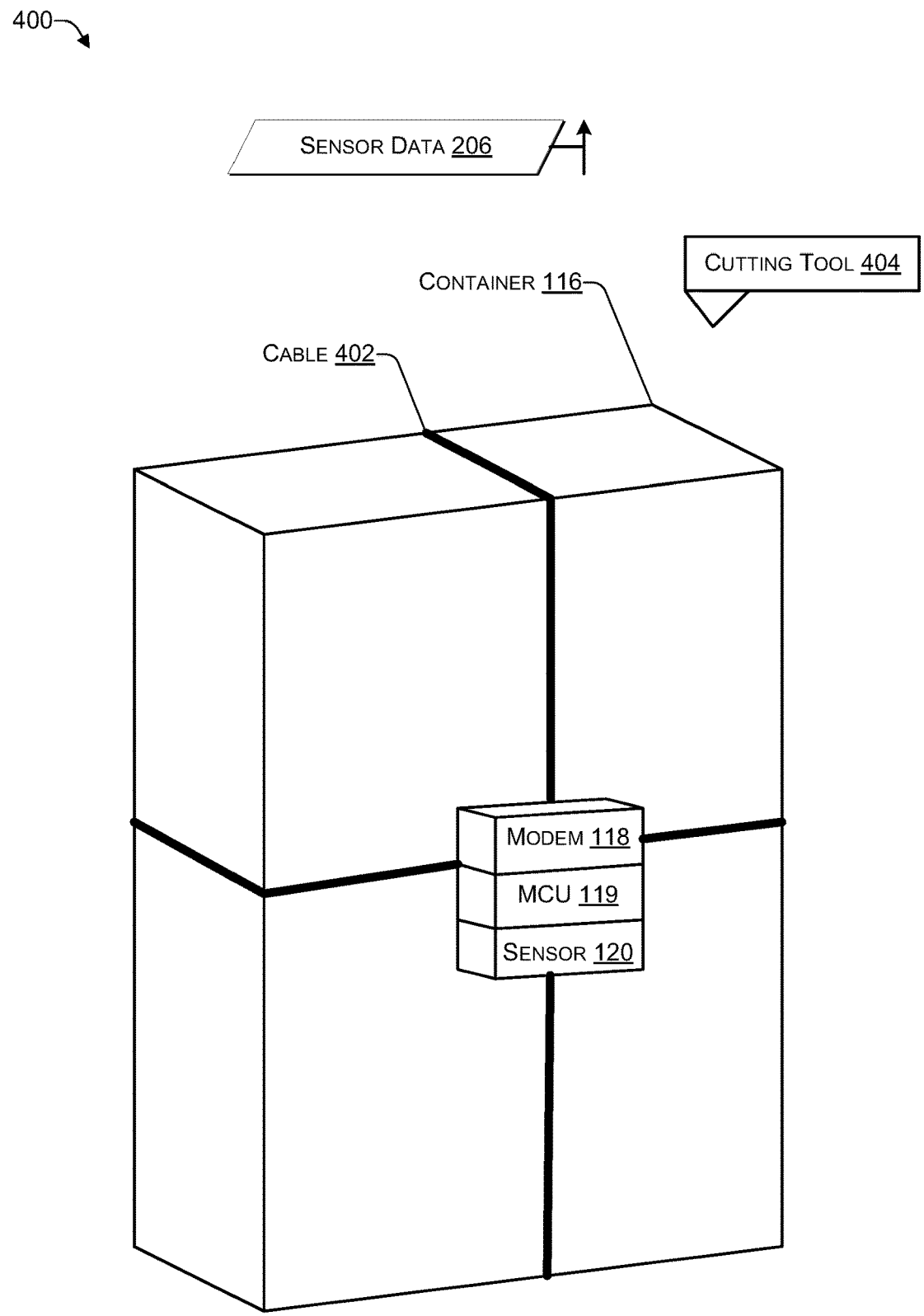
FIG. 4 is a block diagram of a system in which a cable and a sensor are used to determine when a product container is opened, according to some embodiments.

FIG. 4 is a block diagram of a system 400 in which a cable and a sensor are used to determine when a product container is opened, according to some embodiments. A cable 402 may be wrapped around the container 116 and electrically connected to the sensor 120. To open the container 116, a cutting tool 404 may be used to cut the cable 402. For example, the sensor 120 may detect when the cable 402 is cut because a circuit that includes the MCU 119, the sensor 120, and the cable 404 may change from closed to open and send the sensor data 206 using the modem 118. The server 104 of FIG. 1 may use the sensor data 206 to determine that the container 116 has been opened.

Figure 5:
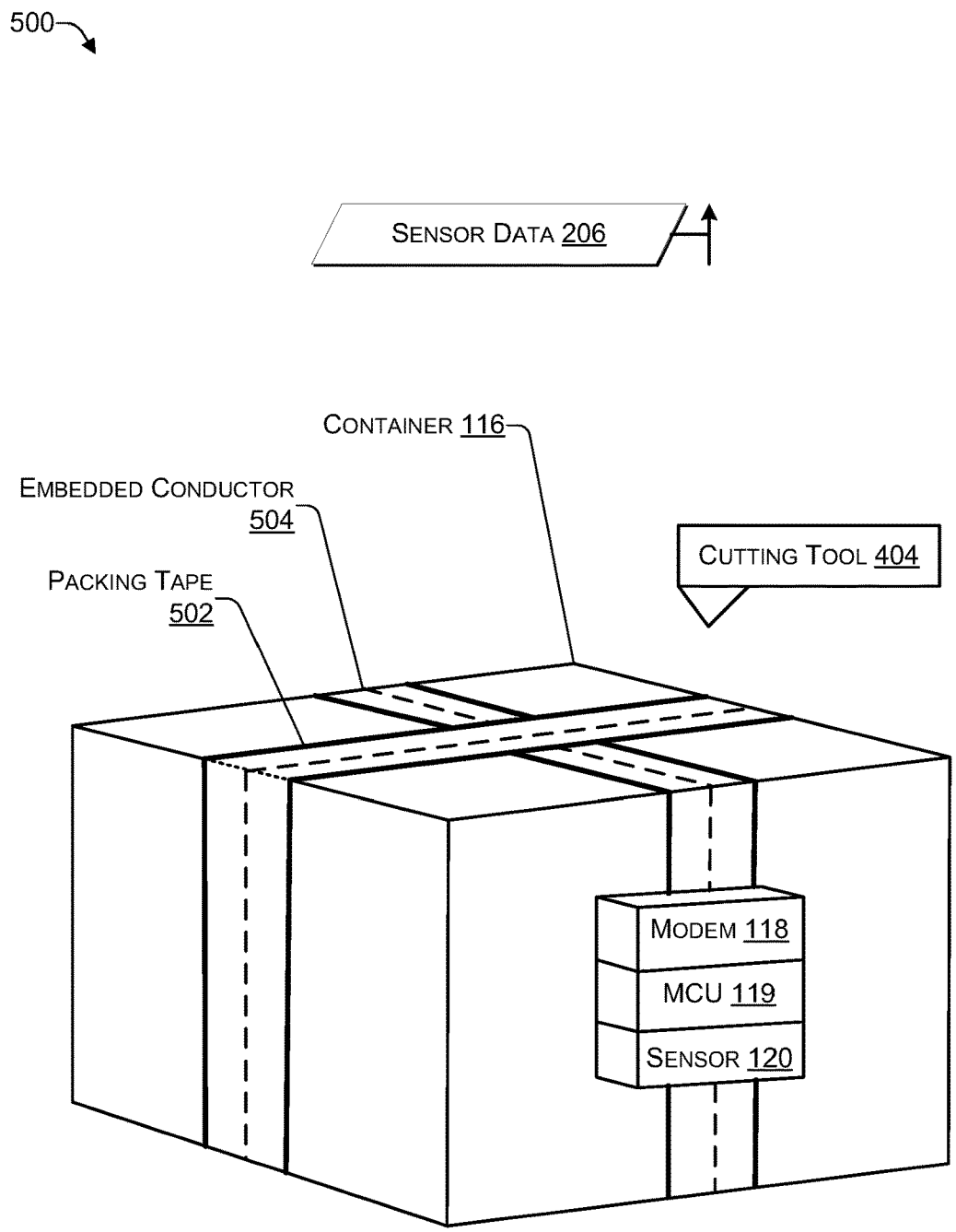
FIG. 5 is a block diagram of a system in which packing tape with an embedded conductor and a sensor are used to determine when a product container is opened, according to some embodiments.

FIG. 5 is a block diagram of a system 500 in which packing tape with an embedded conductor and a sensor are used to determine when a product container is opened, according to some embodiments. Packing tape 502 that includes an embedded conductor 504 may be used to seal (e.g., flaps on a top and a bottom of) the container 116. The embedded conductor 504 may be electrically connected to the sensor 120. To open the container 116, the cutting tool 404 may be used to cut the packing tape 502, including the embedded conductor 504. For example, the sensor 120 may detect when the embedded conductor 504 is cut because a circuit that includes the MCU 119, the sensor 120, and the embedded conductor 504 may change from closed to open and send the sensor data 206 using the modem 118. The server 104 of FIG. 1 may use the sensor data 206 to determine that the container 116 has been opened.

Figure 6:
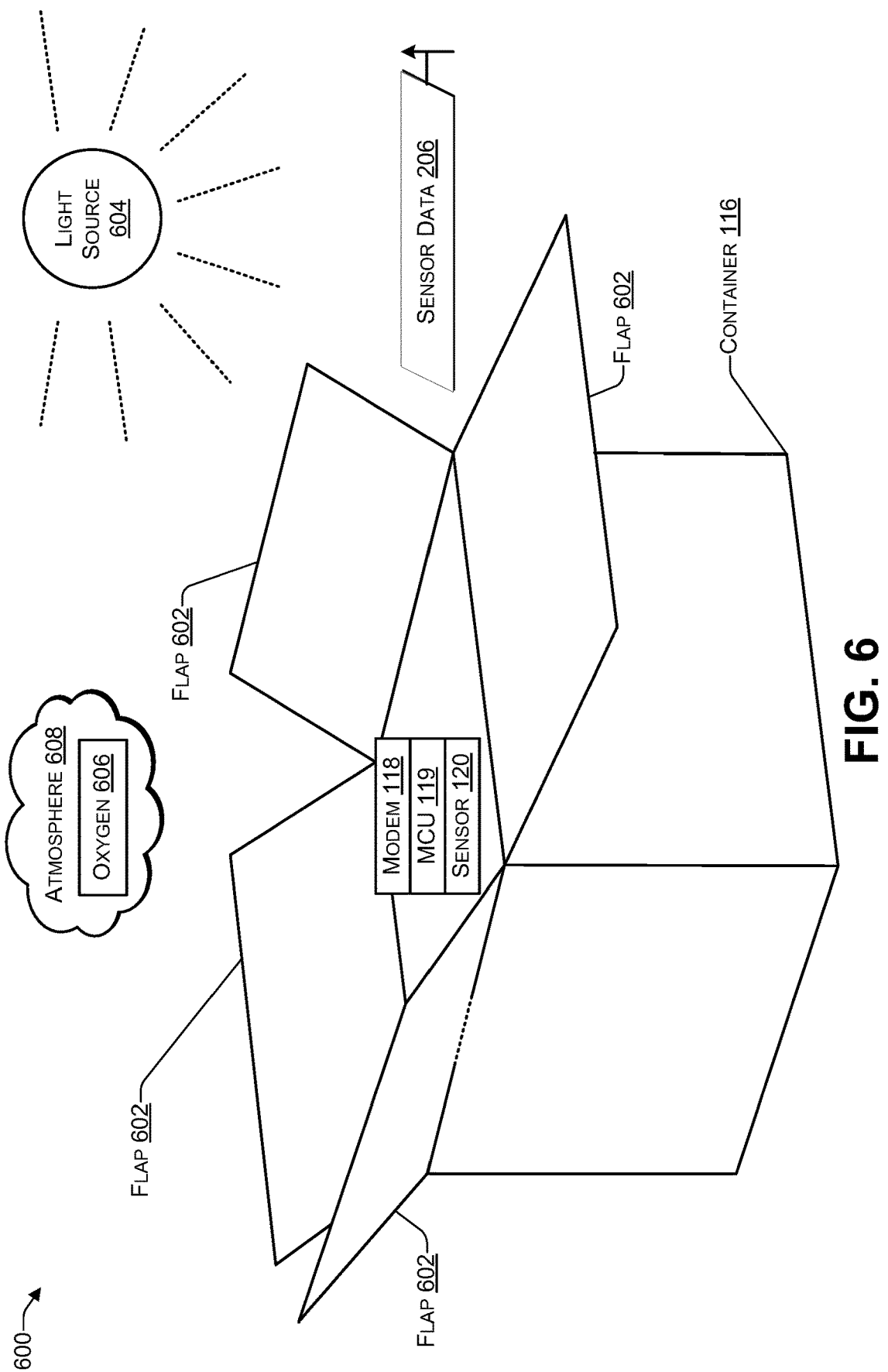
FIG. 6 is a block diagram of a system in which a sensor is used to determine when a product container is opened, according to some embodiments.

FIG. 6 is a block diagram of a system 600 in which a sensor is used to determine when a product container is opened, according to some embodiments. The container 116 may include the sensor 120.

If the sensor 120 is sensitive to light, then when a customer opens one or more flaps 602 of the container 116 to remove a product (e.g., the product 114 of FIG. 1), the sensor 120 may receive light from a light source 604 (e.g., the sun or an indoor light source such as a lamp) and send the sensor data 206 (e.g., indicating that the container 116 was opened) using the modem 118. The server 104 of FIG. 1 may use the sensor data 206 to determine that the container 116 has been opened.

If the sensor 120 is sensitive to oxygen and the container 116 (or an inner container, such as plastic bag) is vacuum sealed, then when a customer opens one or more flaps 602 of the container 116 (or unseals the inner container) to remove a product (e.g., the product 114 of FIG. 1), the sensor 120 may detect oxygen 606 in the atmosphere 608 and, in response, send the sensor data 206 (e.g., indicating that the container 116 was opened) using the modem 118. The server 104 of FIG. 1 may use the sensor data 206 to determine that the container 116 has been opened.

Figure 7:
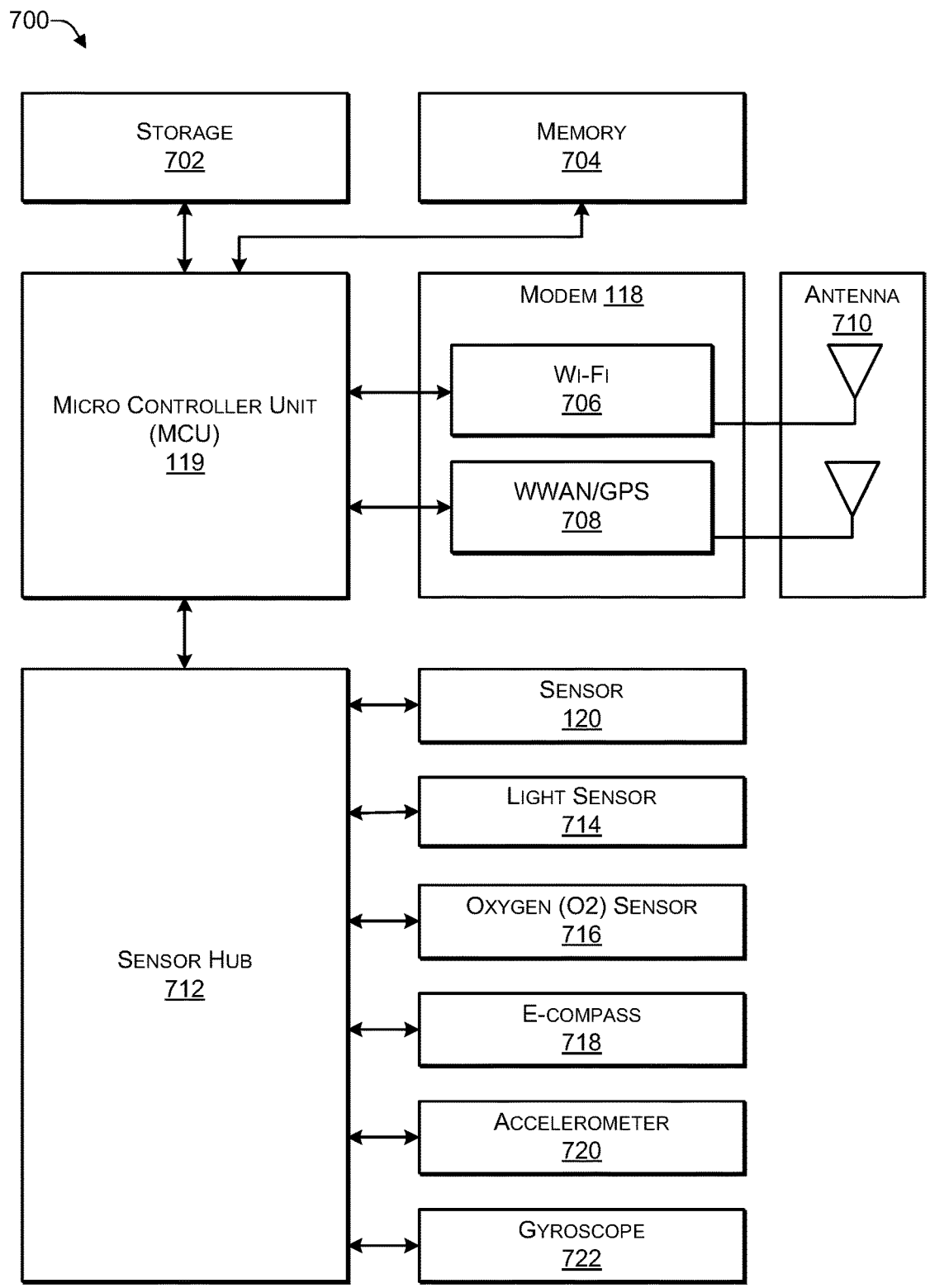
FIG. 7 is a block diagram of a system that includes a sensor hub, according to some embodiments.

FIG. 7 is a block diagram of a system 700 that includes a sensor hub, according to some embodiments. The system 700 may include a storage device 702 (e.g., a solid-state drive or the like) and a memory 704 (e.g., RAM) coupled to the MCU 119. The modem 118 may include a Wi-Fi (e.g., IEEE 802.11) transceiver 706. The modem 118 may include a wireless wide area network (WWAN) transceiver 708. In some cases, the WWAN transceiver 708 may be capable of determining location information (e.g., a location of the system 700) by accessing global positioning satellites (GPS). The Wi-Fi 706 and the WWAN/GPS 708 may be connected to one or more antennas 710.

The MCU 119 may be connected to a sensor hub 712. The sensor hub 712 may be connected to one or more sensors, such as, for example, the sensor 120, a light sensor 714, an oxygen sensor 716, an e-compass 718, an accelerometer 720, a gyroscope 722, another type of sensor, or any combination thereof. In this example, the sensor 120 may be used to detect when a wire is cut, causing a circuit to change from closed to open, as described in FIG. 4 and FIG. 5. The light sensor 714 may be used to detect when a container is opened and the light sensor 714 detects light, as described in FIG. 6. The oxygen sensor 716 may be used to determine when a sealed (e.g., vacuum sealed) container is opened, e.g., based on the oxygen sensor 716 detecting oxygen, as described in FIG. 6.

Two or more individual components of the system 700 may be packaged together into a system-on-a-chip (SOC) (e.g., an integrated device). In some cases, the SOC may be combined with other components of the system 700 on a circuit board. For example, the modem 118 and the antenna 710 may be integrated into a SOC modem and at least a portion of the remaining components may be integrated into an SOC sensor.

Figure 8:
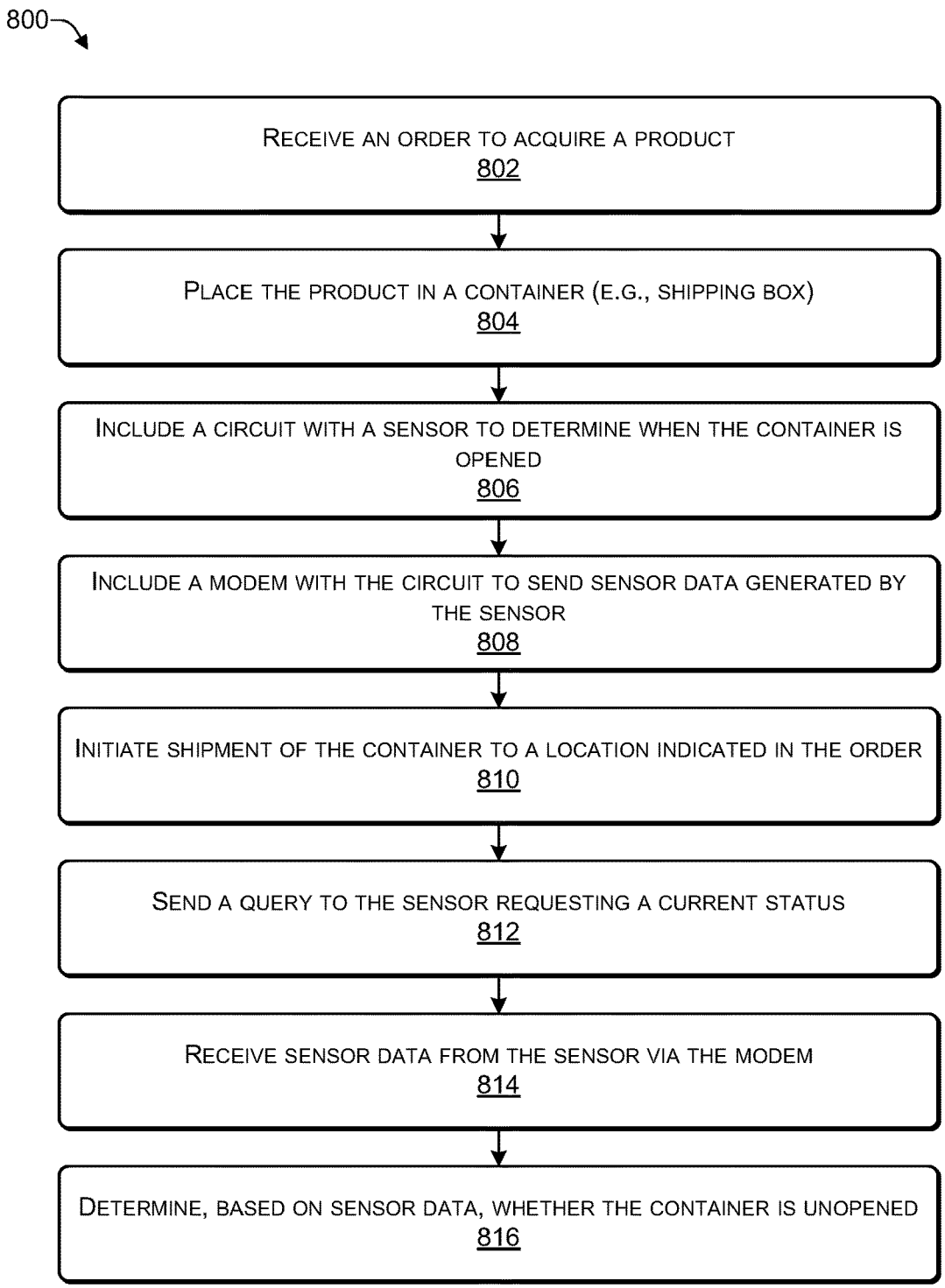
FIG. 8 is a flowchart of a process that includes shipping a product in a container that includes a sensor and a modem, according to some embodiments.
Figure 9:
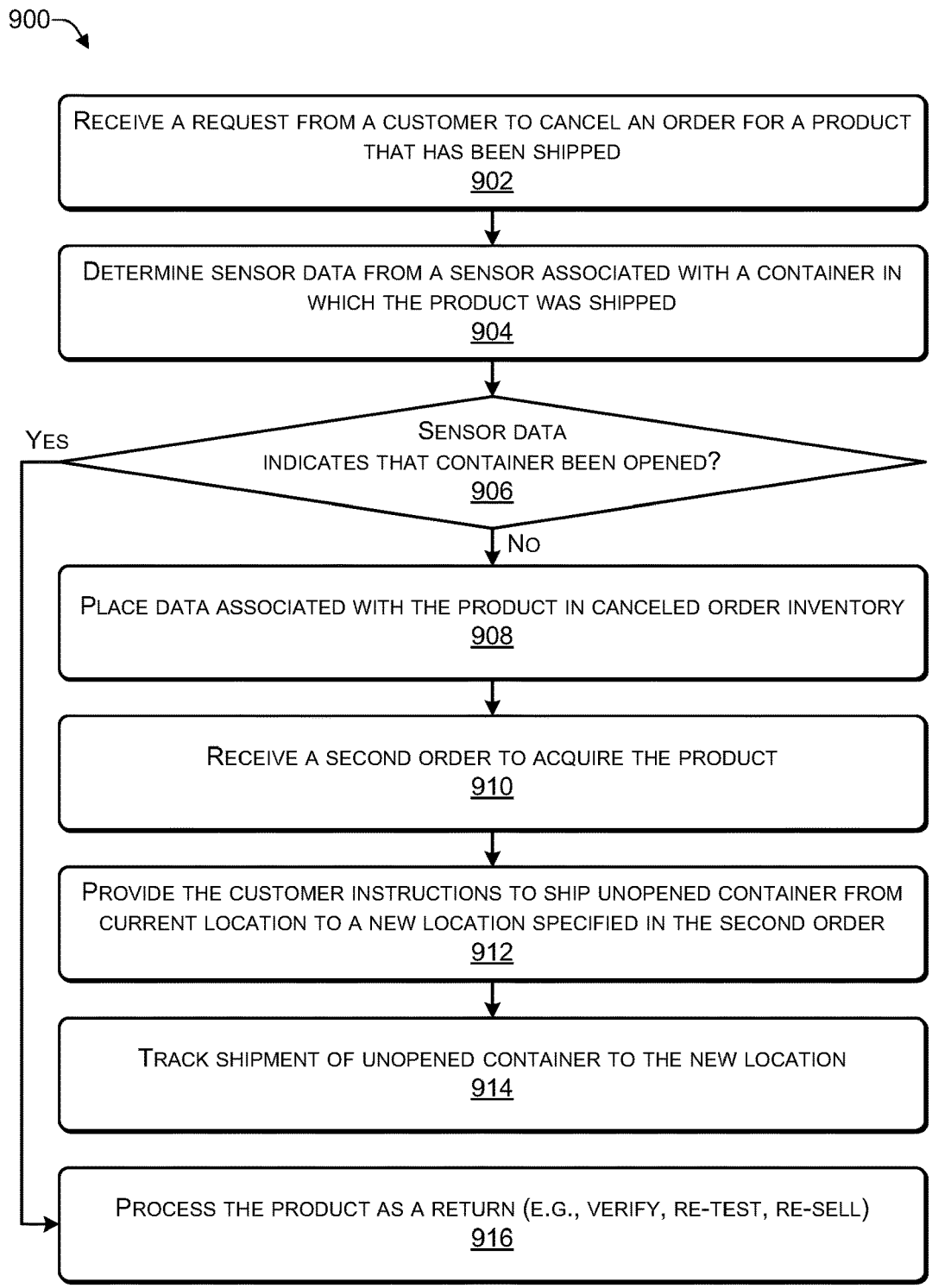
FIG. 9 is a flowchart of a process that includes tracking a shipment of an unopened container from a current location to a new location, according to some embodiments.

In the flow diagram of FIGS. 8 and 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 800 and 900 are described with reference to FIGS. 1, 2, 3, 4, 5, 6, and 7 as described above, although other models, frameworks, systems and environments may be used to implement these processes.

FIG. 8 is a flowchart of a process 800 that includes shipping a product in a container that includes a sensor and a modem, according to some embodiments. The process 800 may be performed by a server, such as the server 104 of FIGS. 1, 2, and 3.

At 802, an order to acquire a product may be received. For example, in FIG. 1, the server 104 may receive the order 112.

At 804, the product may be placed in a container. At 806, a circuit with a sensor to determine when the container is opened may be included in the container. At 808, a modem may be included with the circuit to send sensor data generated by the sensor may be included in the container. For example, in FIG. 1, the warehouse 108 may place the product 114 in the container 116. The warehouse 108 may include at least a portion of the system 700 (e.g., the modem 118, the MCU 119, and the sensor 120) in the container 116 as illustrated in FIG. 4, 5, or 6. The modem 118 may be communicatively coupled to the sensor 120 to enable the modem 118 to (1) wirelessly receive a message (e.g., from the server 104 via the network 106) and pass the message to the sensor 120 and (2) receive sensor data generated by the sensor 120 and wirelessly transmit the sensor data via the network 106 to, for example, the server 104.

At 810, a shipment of the container to a location indicated in the order may be initiated. For example, in FIG. 1, the warehouse may electronically instruct a courier 130 (e.g., FedEx®, UPS®, USPS®, or the like) to physically transport the container 116 to the location 110(1) identified in the order 112 as the delivery address.

At 812, a query may be sent to the sensor (via the modem) requesting a current status. At 814, sensor data may be received, via the modem, from the sensor. At 816, a determination may be made, based on the sensor data, whether the container is unopened. For example, in FIG. 2, the server 104 may send the query 204, via the network 106 and the modem 118, to the sensor 120. In response, the sensor 120 may send, via the modem 118 and the network 106, the sensor data 206 (e.g., indicating whether a circuit associated with the sensor 120 is open or closed, whether the sensor 120 has received light, or the like) to the server 104. The server 104 may determine, based on the sensor data 206, whether the container 116 is opened or unopened. In some cases, the sensor data 206 may include a location of the container 116 (e.g., as determined by the WWAN/GPS 708 of FIG. 7).

FIG. 9 is a flowchart of a process 900 that includes tracking a shipment of an unopened container from a current location to a new location, according to some embodiments. The process 900 may be performed by a server, such as the server 104 of FIGS. 1, 2, and 3.

At 902, a request may be received to cancel an order for a product that has been shipped. At 904, a request to provide sensor data may be sent to a sensor associated with a container in which the product was shipped. At 906, a determination may be made whether the sensor data indicates that the container has been opened. If a determination is made, at 906, that the sensor data indicates that "no" the container has not be opened, then the process proceeds to 908. For example, in FIG. 2, the first customer may decide to cancel the order 112 of FIG. 1 and send a cancellation notification 202 to the server 104. The server 104 may receive the cancellation notification 202 and send a query 204, via the network 106 and the modem 118, to the sensor 120. In response, the sensor 120 may send, via the modem 118 and the network 106, sensor data 206 (e.g., whether a circuit associated with the sensor 120 is open or closed, whether the sensor 120 has received light, or the like) to the server 104. The server 104 may determine, based on the sensor data 206, whether the container 116 is opened or unopened.

At 908, data associated with the product may be placed in a canceled order inventory. For example, in FIG. 2, when the server 104 determines, based on the sensor data 206, that the container 116 is unopened, the server 104 may provide this information to the warehouse 108. The warehouse 108 may add the order data 122(1) associated with the order 112 to the cancelled order inventory 208. The order data 122(1) may include the order 112 and the product ID 126 of the product 114. The warehouse 108 may determine a location of the container 116 (e.g., from the courier 130 of FIG. 1), e.g., whether container 116 is enroute to the location 110(1) or whether the container 116 has arrived at the location 110(1), and store the location as location data 210 in the order data 122(1). The warehouse 108 may store a status of the container 116, e.g., the status of the container 116 is unopened, in status data 212.

At 910, a second order to acquire the product may be received. At 912, the customer may be provided with instructions (e.g., including a shipping label) to ship the unopened container from a current location to a new location specified in the second order. At 914, the shipment of the unopened container may be tracked to the new location. For example, in FIG. 2, the server 104 may monitor incoming orders to determine if any of the incoming orders are for products listed in the canceled order inventory 208, before determining if the products are in the inventory 128. For example, the server 104 may receive the second order 214 from the computing device 102(N). The server 104 may determine that the second order 214 is to acquire (e.g., purchase or lease) the product 114, associated with the product ID 126. The order 214 may indicate that the product 114 is to be shipped to the location 110(N). The server 104 may determine, based on the order 112 in the canceled order inventory 208 that the product 114 has been shipped to the location 110(1) and is currently unopened. To fulfill the second order 214, the server 104 may send a shipping label 216, along with instructions, to the computing device 102(1) associated with the first customer at the location 110(1). For example, the server 104 may instruct the first customer to apply the shipping label 216 to the container 116 and (1) drop the container 116 off at a particular courier's drop-off location or (2) wait for a particular courier to pick up the container 116 (with the shipping label 216) at the location 110(1). The instructions may ask the first customer to call the particular courier to have the container 116 picked up or the server 106 may automatically (e.g., without human interaction) notify the particular courier to pick up the container 116 from the location 110(1). For example, in FIG. 3, after the container 116 has arrived at the location 110(1), the shipping label 216 may be applied to the container 116. The courier 302 may transport the container 116 from the location 110(1) to the location 110(N) specified in the second order 214. The server 104 may track the shipment of the container 116 from the location 110(1) to the location 110(N).

If a determination is made, at 906, that the sensor data indicates that "yes" the container has been opened, then the process proceeds to 916, where the product is processed as a return (e.g., the return is verified, re-tested, and re-sold as an open box or recertified product). For example, in FIG. 2, if the server 104 receives the sensor data 206 of FIG. 2 from the sensor 120 and determines (from the sensor data 206) that the container 116 has been opened, then the server 104 may process the product 114 as an open-box return and fulfill the second order 214 from the inventory 128 of the warehouse 108 (e.g., rather than from the canceled order inventory 208). For example, the server 104 may cancel the shipping label to ship the container 116 from the location 110(1) to the location 110(N). The server 104 may send a new shipping label to the first customer to ship the opened container 116 from the location 110(1) to the warehouse 108. The warehouse 108 may process the opened container 116 by verifying an authenticity of the product 114, re-testing the product 114, and then selling the product 114 as an open-box or re-certified product.

Figure 10:
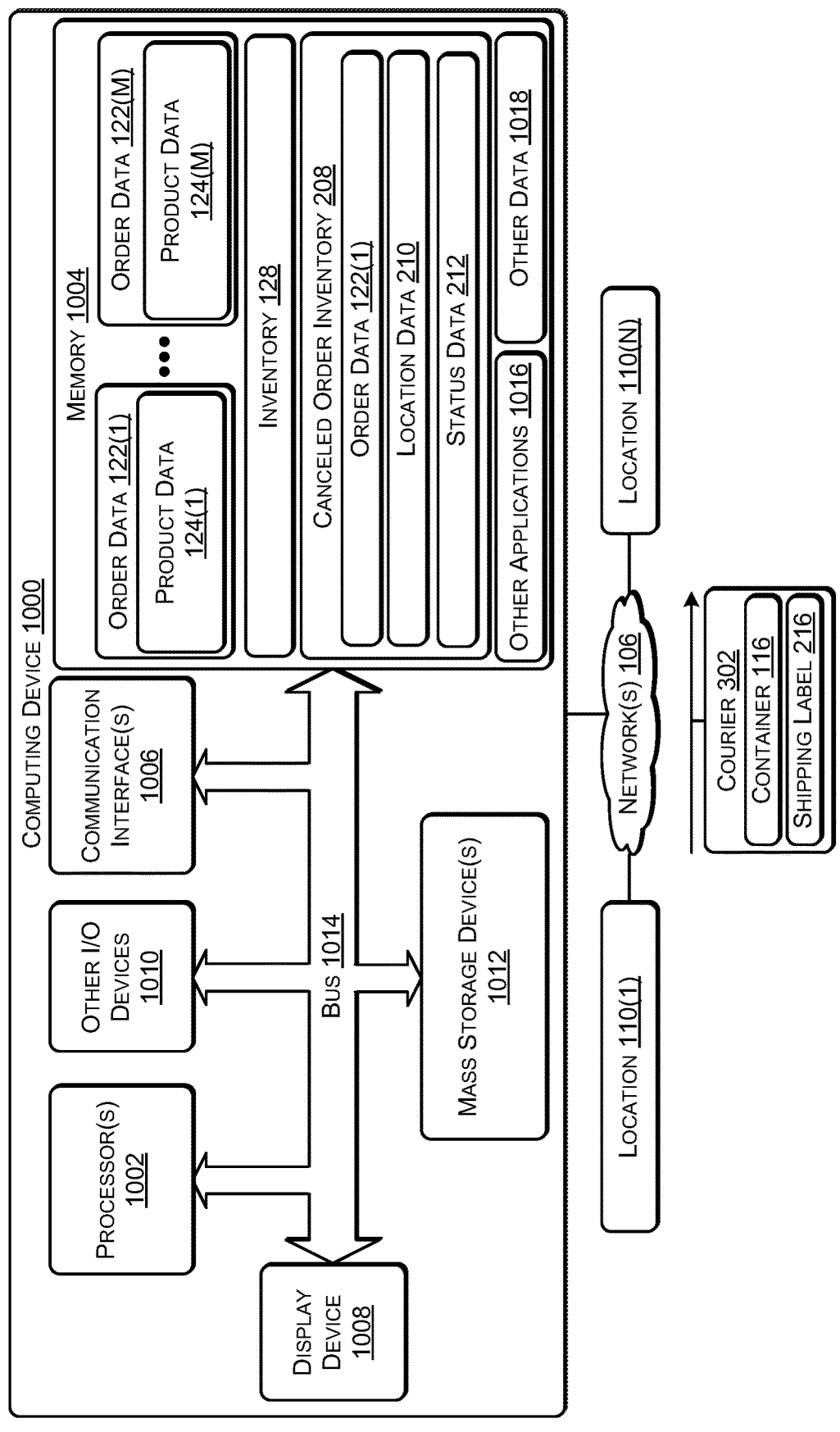
FIG. 10 illustrates an example configuration of a computing device that can be used to implement the systems and techniques described herein.

FIG. 10 illustrates an example configuration of a computing device 1000 that can be used to implement the systems and techniques described herein, such as for example, the computing devices 102 and the server 104 of FIG. 1. For illustration purposes, the computing device 1000 is illustrated in FIG. 10 as implementing the server 104 of FIG. 1.

The computing device 1000 may include one or more processors 1002 (e.g., CPU, GPU, or the like), a memory 1004, communication interfaces 1006, a display device 1008, other input/output (I/O) devices 1010 (e.g., keyboard, trackball, and the like), the sensors 206, and one or more mass storage devices 1012 (e.g., disk drive, solid state disk drive, or the like), configured to communicate with each other, such as via one or more system buses 1014 or other suitable connections. While a single system bus 1014 is illustrated for ease of understanding, it should be understood that the system buses 1014 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 1002 are one or more hardware devices that may include a single processing unit or a number of processing units, all of which may include single or multiple computing units or multiple cores. The processors 1002 may include a graphics processing unit (GPU) that is integrated into the CPU or the GPU may be a separate processor device from the CPU. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 1004, mass storage devices 1012, or other computer-readable media.

Memory 1004 and mass storage devices 1012 are examples of computer storage media (e.g., memory storage devices) for storing instructions that can be executed by the processors 1002 to perform the various functions described herein. For example, memory 1004 may include both volatile memory and non-volatile memory (e.g., RAM, ROM, or the like) devices. Further, mass storage devices 1012 may include hard disk drives, solid-state drives, removable media, including external and removable drives, memory cards, flash memory, floppy disks, optical disks (e.g., CD, DVD), a storage array, a network attached storage, a storage area network, or the like. Both memory 1004 and mass storage devices 1012 may be collectively referred to as memory or computer storage media herein and may be any type of non-transitory media capable of storing computer-readable, processor-executable program instructions as computer program code that can be executed by the processors 1002 as a particular machine configured for carrying out the operations and functions described in the implementations herein.

The computing device 1000 may include one or more communication interfaces 1006 for exchanging data via the network 106. The communication interfaces 1006 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 1006 can also provide communication with external storage, such as a storage array, network attached storage, storage area network, cloud storage, or the like.

The display device 1008 may be used for displaying content (e.g., information and images) to users. Other I/O devices 1010 may be devices that receive various inputs from a user and provide various outputs to the user, and may include a keyboard, a touchpad, a mouse, a printer, audio input/output devices, and so forth.

The computer storage media, such as memory 116 and mass storage devices 1012, may be used to store software and data. For example, the computer storage media may be used to store the order data 122, the inventory 128 (for the warehouse 108), the canceled order inventory 208, other applications 1016 and other data 1018.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by one or more processors, a request to cancel a first order to purchase a product and ship the product to a first location;
   determining, by the one or more processors, that the product has been shipped to the first location in a container that includes a seal sufficient to prevent light from entering into the container and a circuit board comprising a modem and a sensor receptive to light, the sensor positioned proximate to the seal;
   receiving, by the one or more processors, sensor data from the sensor, the sensor data transmitted by the modem over a wireless network;
   determining, by the one or more processors and based on the sensor data regarding light, whether the container has been opened such that the seal has been broken to cause the light to strike the sensor;
   based on the open container determination, if the container has not been opened,
   placing, by the one or more processors, the product in a canceled order inventory;
      monitoring, by the one or more processors, incoming orders to determine if the incoming orders comprise the product;
      receiving, by the one or more processors, a second order of the monitored incoming orders to purchase the product, the second order including instructions to ship the product to a second location;
      instructing a customer who transmitted the request to cancel the first order to ship the first order to the second location;
      instructing, by the one or more processors, a courier to transport the product from the first location to the second location to complete the purchase of the product as a new product with respect to the second order and to avoid processing the product as a returned product with respect to the first order; and
   based on the open container determination, if the container has been opened,
      instructing, by the one or more processors, a courier to transport the product to a location associated with a seller of the product.

2. The method of claim 1, wherein instructing the courier to transport the product to the second location comprises:
   determining that the container is located at the first location; and
   instructing the courier to transport the container from the first location to the second location.

3. The method of claim 1, wherein instructing the courier to transport the product to the second location comprises:
   receiving, by the courier, the product provided by the customer; and
   instructing the courier to transport the container to the second location.

4. The method of claim 1, wherein:
   breaking the seal of the container causes the light to strike the sensor, causing the circuit board to determine that the container has been opened.

5. A server comprising:
   one or more processors; and
   one or more non-transitory computer readable media storing instructions executable by the one or more processors to perform operations comprising:
      receiving a request to cancel a first order to purchase a product and ship the product to a first location;
      determining that the product has been shipped to the first location in a container that includes a seal sufficient to prevent light from entering into the container and a circuit board comprising a modem and a sensor receptive to light, the sensor positioned proximate to the seal;
      receiving sensor data from the sensor, the sensor data transmitted by the modem over a wireless network;
      determining, based on the sensor data regarding light, whether the container has been opened such that the seal has been broken to cause the light to strike the sensor;

based on the open container determination, if the container has not been opened,
- placing the product in a canceled order inventory;
- monitoring, by the one or more processors, incoming orders to determine if the incoming orders comprise the product;

receiving a second order to purchase the product, the second order of the monitored incoming orders including instructions to ship the product to a second location; and instructing a customer who transmitted the request to cancel the first order to ship the first order to the second location;

instructing a courier to transport the product from the first location to the second location to complete the purchase of the product as a new product with respect to the second order and to avoid processing the product as a returned product with respect to the first order; and based on the open container determination, if the container has been opened,
- instructing, by the one or more processors, a courier to transport the product to a location associated with a seller of the product.

6. The server of claim 5, wherein instructing the courier to transport the product to the second location comprises:
- instructing the courier to transport the container from the first location to the second location based at least in part on determining that the container is located at the first location; or
- instructing the courier to transport the container to the second location.

7. The server of claim 5, wherein:
- breaking the seal of the container causes the light to strike the sensor, causing the circuit board to determine that the container has been opened.

8. One or more non-transitory computer readable media storing instructions executable by one or more processors to perform operations comprising:
- receiving a request to cancel a first order to purchase a product and ship the product to a first location;
- determining that the product has been shipped to the first location in a container that includes a seal sufficient to prevent light from entering into the container and a circuit board comprising a modem and a sensor receptive to light, the sensor positioned proximate to the seal;
- receiving sensor data from the sensor, the sensor data transmitted by the modem over a wireless network;
- determining, based on the sensor data regarding light, whether the container has been opened such that the seal has been broken to cause the light to strike the sensor;
- based on the open container determination, if the container has not been opened,
  - placing the product in a canceled order inventory;
  - monitoring, by the one or more processors, incoming orders to determine if the incoming orders comprise the product;
- receiving a second order to purchase the product, the second order of the monitored incoming orders including instructions to ship the product to a second location;
- instructing a customer who transmitted the request to cancel the first order to ship the first order to the second location;
- instructing a courier to transport the product from the first location to the second location to complete the purchase of the product as a new product with respect to the second order and to avoid processing the product as a returned product with respect to the first order; and
- based on the open container determination, if the container has been opened,
  - instructing, by the one or more processors, a courier to transport the product to a location associated with a seller of the product.

9. The one or more non-transitory computer readable media of claim 8, wherein instructing the courier to transport the product to the second location comprises:
- determining that the container is located at the first location; and
- instructing the courier to transport the container from the first location to the second location.

10. The one or more non-transitory computer readable media of claim 8, wherein instructing the courier to transport the product to the second location comprises:
- receiving, by the courier, the product provided by the customer; and
- instructing the courier to transport the container to the second location.

11. The one or more non-transitory computer readable media of claim 8, wherein:
- breaking the seal of the container causes the light to strike the sensor, causing the sensor to generate the sensor data indicating that the container has been opened.

* * * * *